United States Patent [19]

Van Tongeren et al.

[11] Patent Number: 4,774,522

[45] Date of Patent: Sep. 27, 1988

[54] METHOD OF RECORDING A BINARY SIGNAL ON AN OPTICALLY READABLE RECORD CARRIER AND APPARATUS FOR CARRYING OUT THE METHOD

[75] Inventors: Hendricus F. J. J. Van Tongeren; Martin A. J. P. Farla, both of Eindhoven, Netherlands

[73] Assignee: U.S. Philips Corporation, New York, N.Y.

[21] Appl. No.: 24,937

[22] Filed: Mar. 12, 1987

[30] Foreign Application Priority Data

Oct. 29, 1986 [NL] Netherlands ............... 8602718

[51] Int. Cl.$^4$ ............ G01D 9/00; G01D 15/10
[52] U.S. Cl. ..................... 346/1.1; 346/76 L; 358/296
[58] Field of Search ........ 346/1.1, 76 L, 107, 346/108; 369/59; 360/40, 44; 358/296

[56] References Cited

U.S. PATENT DOCUMENTS

| | | |
|---|---|---|
| 4,473,829 | 9/1984 | Schouhamer Immink et al. ............. 346/1.1 |
| 4,490,730 | 12/1984 | Youmans ............. 346/76 L |
| 4,646,103 | 2/1987 | Sugiyama et al. ............. 346/1.1 |

FOREIGN PATENT DOCUMENTS 0206824 12/1986 European Pat. Off. .
60-25032 2/1985 Japan .

Primary Examiner—E. A. Goldberg
Assistant Examiner—Mark Reinhart
Attorney, Agent, or Firm—Algy Tamoshunas

[57] ABSTRACT

A method and apparatus are described for recording a binary information signal on a record carrier having an information layer whose optical properties are modified upon heating. An information pattern corresponding to the information signal is obtained by moving the record carrier relative to an optical system which focuses a radiation beam onto the information layer. A recording mark is written on the information layer is selected time intervals by locally heating the information layer with the focussed radiation beam. The amount of radiation energy applied during a selected time interval depends on the position of the selected time interval in the sequence of consecutive selected time intervals. This provides compensation for the increase in the temperature at the location where the mark is to be recorded due to heating of the layer during recording of a mark in the preceding time interval. The amount of radiant energy that is applied is chosen so that for each recording mark the temperature which is reached in the information layer, and hence the size of the recording mark, is substantially the same.

19 Claims, 9 Drawing Sheets

METHOD OF RECORDING A BINARY SIGNAL ON AN OPTICALLY READABLE RECORD CARRIER AND APPARATUS FOR CARRYING OUT THE METHOD

The invention relates to a method of recording a binary information signal on an optically readable record carrier comprising an information layer whose optical properties experience a change upon heating. In such a method an information pattern corresponding to the information signal is formed on the information layer. The information pattern comprises recorded areas with modified optical properties and non-recorded areas with non-modified optical properties. The recorded areas are obtained by focussing a radiation beam onto the information layer and moving the information layer and beam relative to each other. Every subsequent recording mark of a sequence of consecutive and overlapping recording marks is formed by heating a target area with the aid of the radiation beam so as to bring about the change in optical properties in the target area.

The invention further relates to an apparatus, comprising a radiation source and an optical system for focussing the radiation produced by the radiation source on an information layer of a record carrier, the optical properties of said information layer being subject to a change upon heating. The apparatus further includes a drive means for moving the record carrier and the optical system relative to one another, and a control device for controlling the radiation source in dependence on a binary information signal, sequences of consecutive control signals being obtained depending on the binary information signal. The radiation source producing such an amount of radiation energy in response to each control signal of each of the sequences such that the information layer is heated adequately to produce a recording mark having modified optical properties on the information layer.

Such a method and apparatus are known from U.S. Pat. No. 4,473,829. In the known method and apparatus each recording mark is formed by means of one radiation pulse of constant energy content. The application of radiation energy results in a recording mark of substantially constant dimensions being formed on the information layer. This method is eminently suitable for the ablative recording of signals, the information layer at the location of the recording marks being removed as a result of the applied radiation energy. However, when this known method is used with information layers where the material at the location of the recording mark is not removed but where the brief temperature rise in the target area caused by the radiation energy gives rise to a change in optical properties of the material at the location of the recording marks, the dimensions of the recording marks are found not to be constant. An example of this is an information layer having an amorphous structure which changes into a crystalline structure upon heating. This variation in the dimensions of the recording marks results in distortion of the read signal obtained by reading the information pattern.

It is the object of the invention to provide a method and apparatus of the type defined in the opening paragraphs, which makes it possible to provide the record carrier with an information pattern which produces less distortion in the output signal obtained by reading.

As regards the method, this object is achieved in that the manner in which the radiation energy applied for forming each of the recording marks of the sequence is adjusted in dependence on the position of the relevant recording mark in the sequence.

With respect to the apparatus this object is achieved in that the control device comprises signal-generating means for generating control signals of different types. The type of control signal that is generated depends on the position of the control signal in the sequence of consecutive control signals, the radiation source being adapted to apply radiation whose energy content depends on the type of control signal.

The invention is based on the recognition of the fact that when a recording mark of a sequence of consecutive recording, marks is recorded the target area to be heated has already been heated as a result of the radiation energy applied during the recording of preceding recording marks in the sequence. By making the energy of the radiation applied during the recording of each recording mark, and hence the temperature rise produced in the target area by this radiation energy, dependent on the position of the relevant recording mark, the temperature influence of the radiation energy applied during the formation of previous recording marks can be compensated for in a simple manner. As a result; the dimensions of the recording marks, which dimensions depend on the temperature which is reached in the target area, remain substantially constant. Consequently, the distortion of the read signal is minimal.

In practice, it has been found that an acceptable compensation for the above-mentioned temperature influence can be obtained by means of a method which is characterized in that the radiation energy for forming the first recording mark of the sequence has one value, while the radiation energy for forming second and subsequent recording marks has a second value.

A particularly simple method, in which the radiation energy is applied by mens of radiation pulses, is characterized further in that the number of radiation pulses for the application of radiation energy for the formation of the recording marks depends on the position of the recording mark in the sequence.

The method may be characterized further in that the first recording mark of the sequence is formed by means of at least one pre-heating radiation pulse. After a first predetermined time interval is followed by a writing radiation-pulse. The writing radiation pulse produces a recording mark on the information layer, whereas the energy content of the preheating radiation pulse is inadequate to produce the change in optical properties outside the area which is occupied by the recording mark produced by the writing radiation-pulse. In this method the preheating radiation-pulse is employed primarily to raise the temperature in the target area where the recording mark is to be formed. This has the advantage in that the amount of radiation energy to be applied by means of the writing radiation-pulse can reduced.

The dimensions of a recording mark in a method as defined in the opening paragraph, in which the recording marks are formed by changes in the optical properties of the material of the information layer are generally smaller than the dimensions of the recording marks formed by similar ablative recording methods. As a result of this, the resulting information pattern formed by recording marks with modified optical properties does not comply with the standards already established for ablative recording. It is another object of the invention to provide an embodiment which mitigates this drawback.

This object is achieved by a method in which the information signal comprises a string of bit cells. The number of consecutive bit cells of a first logic value is always at least equal to n, n being an integer greater than or equal to 2. An inscribed area corresponding to m bit cells, m being an integer greater than or equal to 2, is obtained by forming a recording mark by means of a radiation pulse at every instant of a series of $m-n+1$ substantially equidistant instants. A predetermined time interval before the first instant of said series of instants, an extension radiation-pulse is generated to form an extension recording mark which overlaps the recording mark formed at the first instant of the series of instants to such an extent that the dimensions of the two overlapping recording marks correspond to the length of n bit cells.

An embodiment of the apparatus is characterized in that the signal-generating means is adapted to generate a first type of control signal as the first control signal of each sequence and to generate a second type of control signal as each second and subsequent control signal of each sequence. This embodiment is very attractive because it requires only control signals of two different types to be generated. Another embodiment of the apparatus, which is attractive because of its simplicity, in which the control device is adapted to supply control signals comprising control pulses and in which the radiation source is adapted to supply radiation pulses in response to a control pulse, is characterized in that the signal-generating means is adapted to generate control signals with the number of control pulses for each type of control signal depending on the position of the control signal in the relevant sequence of control signals.

A further embodiment of the apparatus, in which the control device is adapted to select time intervals from a sequence of consecutive time intervals having a length corresponding to the length of the bit cells and to generate a control signal in each of the selected time intervals, the control signals comprising control pulses and the radiation source being adapted to supply a radiation pulse in response to control pulse, is characterized in that the signal-generating means is adapted to generate control signals whose temporal positions within the selected intervals depend on the positions of the selected intervals in each sequence of consecutive selected time intervals. This embodiment has the advantage that is enables information patterns to be recorded on information layers with optical properties which can be modified by heating and which comply with the prevailing standards for ablative recording.

Embodiments of the invention will now be described in more detail, by way of example with reference to FIGS. 1 to 16, in which FIGS. 1a-c illustrates the principle of recording binary signals on materials whose optical properties are modifiable by heating, FIGS. 2a-2g, 3a-3c, 5a, 5b, 8a-8c, and 15a-15d illustrate methods in accordance with the invention, FIGS. 4a, 4b, 7a and 7b give examples of applying radiation energy in accordance with the inventive method, FIGS. 6a and 6b illustrates a prior-art method of recording binary signals, FIGS. 9 and 16 show embodiments of an apparatus for carrying out the inventive method, FIG. 10 shows an example of a radiation source suitable for use in the apparatus shown in FIG. 9, FIG. 11 shows a suitable example of the control device of FIG. 9 for controlling the radiation source, FIG. 12 shows a number of signals generated in the control device shown in FIG. 11, FIGS. 13 and 14 show parts of the control device shown in FIG. 11.

FIG. 1a shows a transparent record carrier 1 provided with an information layer 2 of a type whose optical properties can be modified by heating and subsequently cooling the information layer 2. Such an information layer 2 may consist of, for example, a material having a non-crystalline structure which can be converted into a crystalline structure by locally melting the information layer by applying heat and subsequently rapidly cooling the layer. Such a material may be, for example, an alloy of Te, Se and Sb. For a survey of such materials reference is made to G. Bouwhuis, J. Braat, A. Huyser, J. Pasman, G. van Rosmalen and K. Schouhamer Immink "Principles of Optical Disc Systems", Adam Hilger Ltd., Bristol 1985, pages 219-225. Further, FIG. 1a shows an optical system 3 by means of which a radiation beam 4 produced by a radiation source, for example a laser beam, can be focussed to form a minute radiation spot (of the order of magnitude of $0.9\mu$) on the information layer 2. The radiation source can generate a radiation pulse P whose energy content is adequate to heat the information layer to such an extent that changes in optical properties are brought about.

FIG. 1b is a plan view of the information layer 2 on which a recording mark 5 is formed by means of the radiation pulse P using the method described above.

FIG. 1c illustrates the distribution T of the temperature layer $T_r$ along the line 1 of the information 2 immediately after heating by the radiation pulse P. The line 6 represents the recording level $T_s$ above which the change in optical properties is obtained. The heat applied by means of the radiation pulse P spreads to the area surrounding the recording mark 5, causing the temperature at the location of the recording mark 5 to decrease and the temperature in the area surrounding the recording mark to increase. By way of illustration the temperature distribution within the information layer at two consecutive instants after application of the radiation pulse is indicated by $T_a$ and $T_b$ in FIG. 1c.

FIG. 2a illustrates a bit sequence of a digital information signal comprising consecutive bit cells having a logic value "0" or "1". The signal shown here is encoded in such a way that the number of bit cells having a logic value "1" is at least equal to three. An example of such a coding is the EFM (Eight-to-Fourteen Modulation) described in Netherlands Patent Application No. 8004028. The EFM coding is used as a modulation for recording digital audio information on an optically readable disc in the Compact Disc Digital Audio System. As described in U.S. Pat. No. 4,473,829, such an EFM encoded information signal can be recorded by forming an information pattern of recording marks 5 in the information layer 2, a sequence of three consecutive bit cells of the logic value "1" being represented by one recording mark 5 (see FIG. 2c). A longer sequence of bit cells of the logic value "1" is represented by an area comprising a plurality of overlapping recording marks 5. Such a pattern of recording marks can be obtained by moving the record carrier 1 relative to the optical system 3 in the direction indicated by the arrow 7 (see FIG. 1a). During in each of the selected time intervals of a sequence of consecutive time intervals, a recording mark 5 is formed in the information layer by locally heating the information layer to a temperature above the recording level $T_s$ by means of a sequence of radiation pulses P. In FIG. 2b the radiation pulses P are designated $P_1, \ldots, P_6$, the subscript representing the sequence number of each radiation pulse in a sequence of consecutive radiation pulses P. For the second and subsequent radiation pulses $P_2, \ldots, P_6$ of the sequence of radiation pulses, the temperature in the area where the next recording mark 5 is to be formed will already exceed the ambient value $T_o$ as a result of previous radiation pulses. These temperature rises are indicated by the levels $T_{o1}, T_{o2}, T_{o3}, T_{o5}$ in FIG. 2d. These levels increase asymptotically.

In the method of the invention, the energy content E of each radiation pulse of a sequence of consecutive radiation pulses depends on its position in the sequence in such a way that the sum of the temperature rises in the information carrier caused by a radiation pulse P and the temperature rise already produced by previous radiation pulses of the sequence always remains constant. The temperature distributions in the information layer are represented by $T_1, \ldots, T_6$ in FIG. 2d, the index again representing the sequence number of the corresponding radiation pulse. The recording marks 5 thus obtained are shown in FIG. 2c.

FIGS. 2e-g illustrate the temperature variation $T_1, T_2, \ldots, T_5$ in the record carrier and the dimensions of the recording marks for the case where the energy content of each radiation pulse P is the same. In that case, the temperature during the formation of the recording marks is not the same for all the recording marks 5, as a result of which the diameters of the recording marks 5 are not constant. When the information pattern comprising such recording marks of varying dimensions is read, the read read-out signal will be distorted. The amount of radiation reflected by a recording mark 5 is then not the same for each recording mark.

FIG. 3a shows another method in accordance with the invention. In this embodiment the energy content of every first radiation pulse of a sequence of radiation pulses has the value $E_1$. The energy content of each of the second and subsequent radiation pulses is equal to the value $E_2$, which is smaller than the value $E_1$.

FIG. 3a shows the radiation pulses $P_1, \ldots P_5$ for a sequence of five consecutive selected time intervals $T_1, \ldots T_5$. the corresponding temperature distributions $T_1, \ldots, T_5$ in the information layer 2 immediately after application of the radiation pulses $P_1, \ldots P_5$ is illustrated in FIG. 3b, while the corresponding dimensions of the recording marks are given in FIG. 3c. As is apparent from FIG. 3, the dimensions of the recording marks 5 are not exactly equal to one another. However, the differences between the dimensions of the recording marks are so small that the distortion of the read-out signal obtained when the information pattern formed by these recording marks is read is negligible.

In the embodiments of the invention described in the foregoing, the differences in the amounts of radiation energy applied in the various selected time intervals are obtained by the use of radiation pulses P having different energy contents. The differences in energy content can be obtained, for example, by applying radiation pulses of constant duration and different intensity. These differences can also be obtained by radiation pulses of constant intensity and different duration. The latter of the two methods is to be preferred because of its simplicity.

FIG. 4 illustrates the manner in which the amount of radiation energy applied in the selected time intervals $\tau$ can be varied using another method in accordance with the invention. In accordance with this method the radiation energy is administrered by applying unitary radiation pulses of constant energy content. FIG. 4a illustrates the application of the radiation energy in the first selected time interval $\tau$ of a sequence of consecutive selected time intervals $\tau$. In such a selected time interval $\tau$ the radiation energy is applied by means of radiation pulses P' and P, each having an intensity $I_s$ and a duration $\Delta \tau$. FIG. 4b illustrates the application of radiation energy in a time interval $\tau$ for the second and subsequent selected time intervals $\tau$ of a sequence of consecutive selected time intervals $\tau$. The radiation energy is now applied by means of one unitary radiation pulse P.

FIG. 5 illustrates the temperature distribution $T_1', T_1, \ldots, T_9$ in the information layer immediately after application of the unitary radiation pulses $P', P_1, \ldots P_9$ in the situation that the radiation energy is applied by the above method using unitary radiation pulses in a sequence of nine consecutive selected time intervals $\tau_1, \ldots, \tau_9$. As is apparent from FIG. 5, the energy content of the preheating pulse $P_1'$ is such way that the temperature rise produced by this pulse is inadequate to bring the temperature of the information layer above the recording level $T_S$. Therefore, this first unitary radiation pulse $P_1'$ does not produce a change in the optical properties of the information layer 2. This is an advantage because the first recording mark 5 in a sequence of consecutive recording marks then does not become undesirably large. By way of comparison FIGS. 6a and 6b give the temperature distributions $T_1, \ldots, T_9$ in the case that the radiation energy is applied in accordance with the prior-art method, which does not employ preheating pulses. It is apparent from FIG. 6 that the variations in temperature in the information layer and hence the variations in the dimensions of the recording marks are large if no preheating pulse $P_1'$ is applied.

In the ablative recording of EFM signals it is customary to use a $0.9\mu$ radiation beam for recording the recording marks. For this diameter, the dimension of the recording mark is found to be $1.1\mu$. The dimension of this recording mark corresponds to a sequence of three bit cells of the logic value "1". Sequences of 4 or more bit cells of the logic value "1" are obtained by extending the information pattern by $0.3\mu$ by each time forming a subsequent recording mark which overlaps the preceding recording mark. Such a ratio between the dimensions of the recording mark and the extensions yields an optimum duty cycle of the read-out signal obtained by reading the information pattern.

When EFM signals are recorded on record carriers having information layers whose optical properties change, the optimum diameter of the recording mark is frequently found to be smaller than in ablative recording with a radiation beam of the same diameter. If the diameter of the radiation beam used for recording on such record carriers is selected to be the same as in ablative recording (which may be desirable for reasons of standardisation) the diameters of the recording marks for the two recording methods are not the same. This means that the dimensions of the information patterns for the two recording methods will not be the same either.

Hereinafter, a method in accordance with the invention will be described which uses a radiation beam of the same diameter, as in ablative recording, to record an information pattern whose, comply with the above-described standard for the ablative recording of EFM signals. In accordance with this method two recording marks which overlap one another almost completely are formed in the first time interval $\tau$ of a sequence of consecutive selected time intervals $\tau$, in such a way that the overall length of the two overlapping recording marks corresponds to the diameter of the optimum recording mark in ablative recording.

Figure 1A:
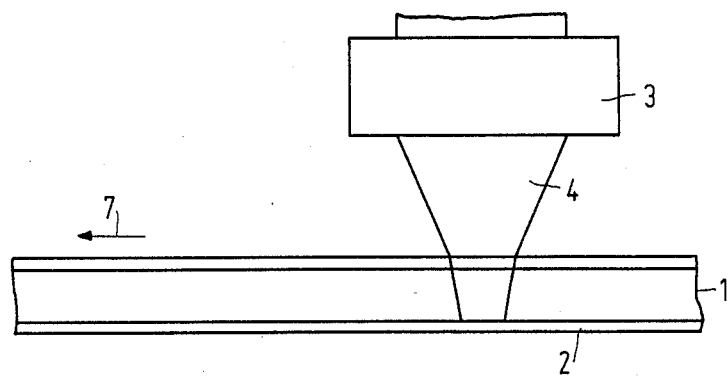
Figure 1B:
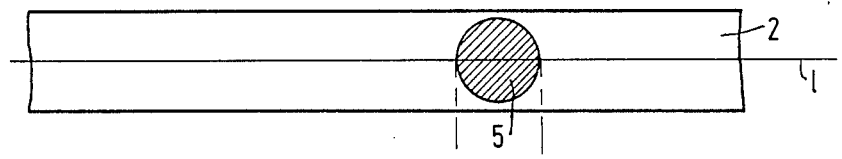
Figure 1C:
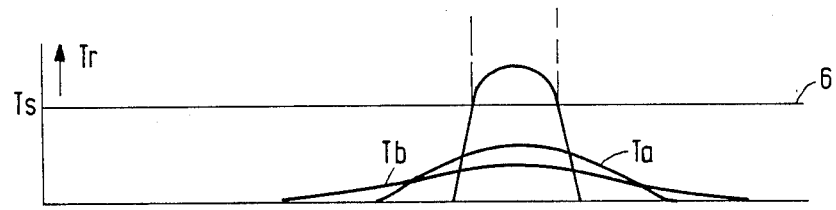
Figure 2:
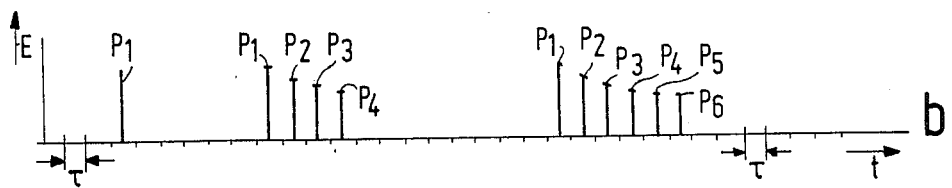
Figure 2:
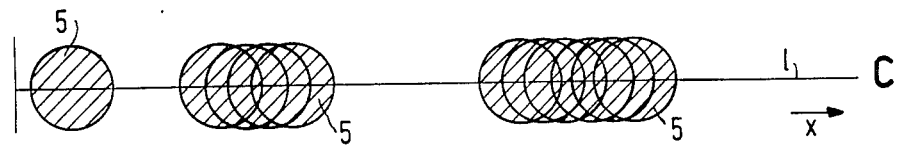
Figure 2:
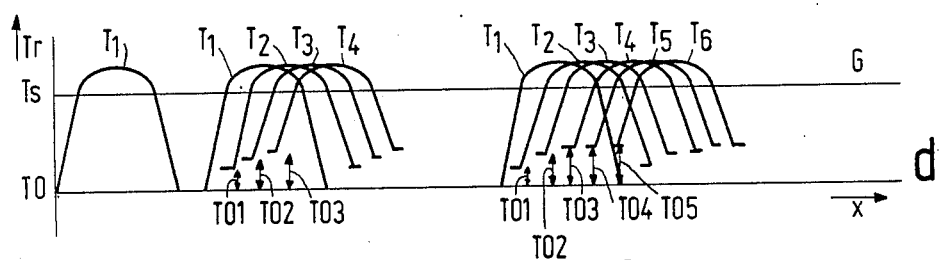
Figure 2:
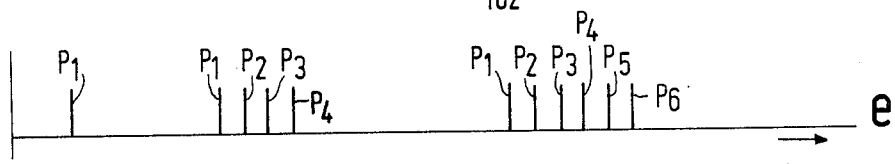
Figure 2:
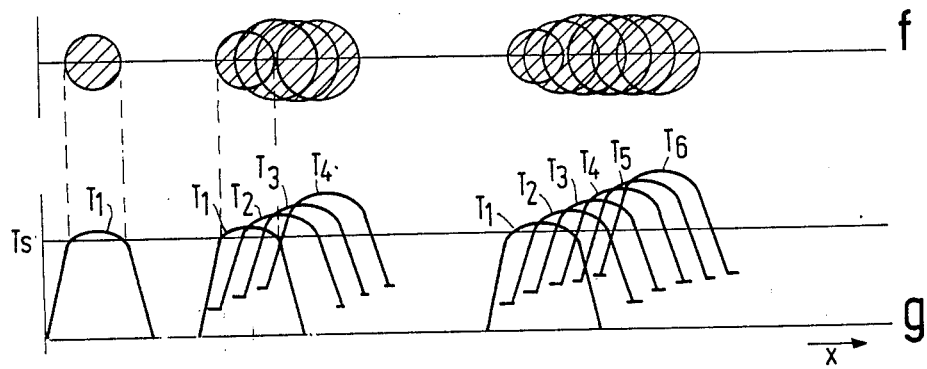
Figure 3:
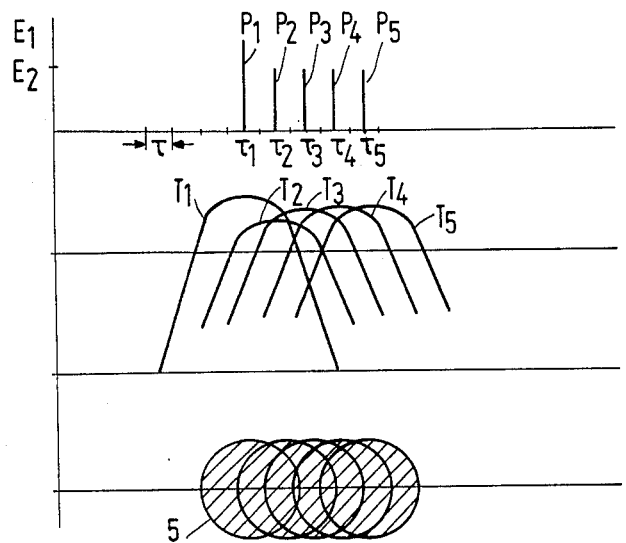
Figure 4:
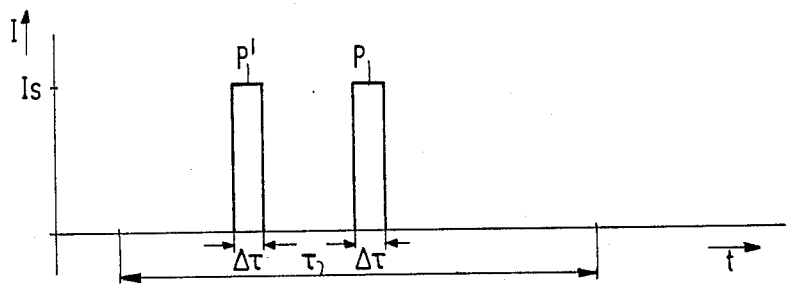
Figure 4:
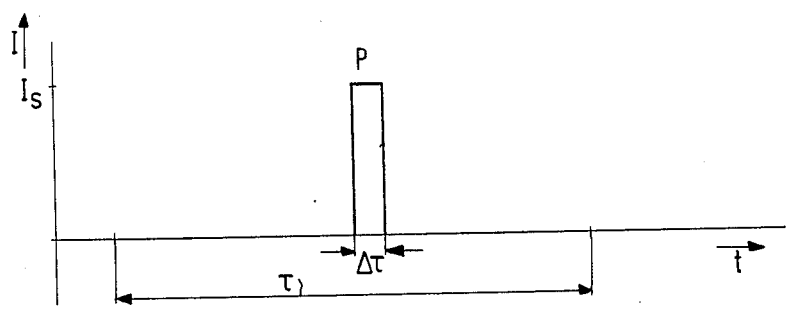
Figure 5:
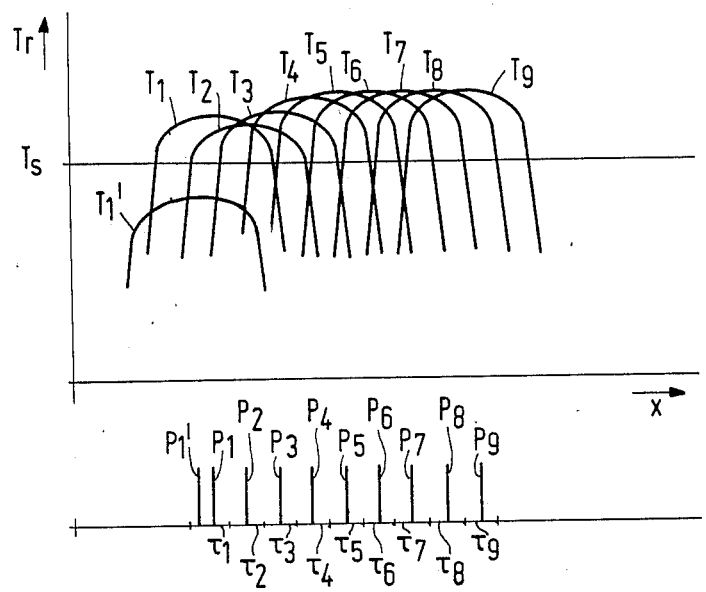
Figure 6:
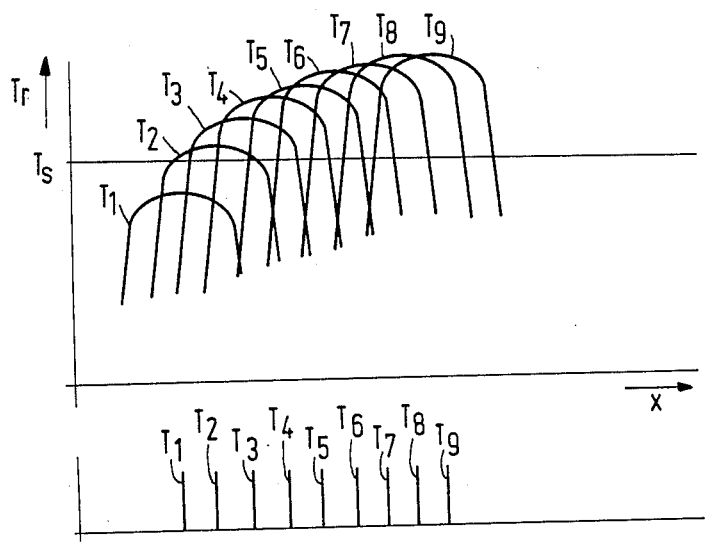
Figure 7:
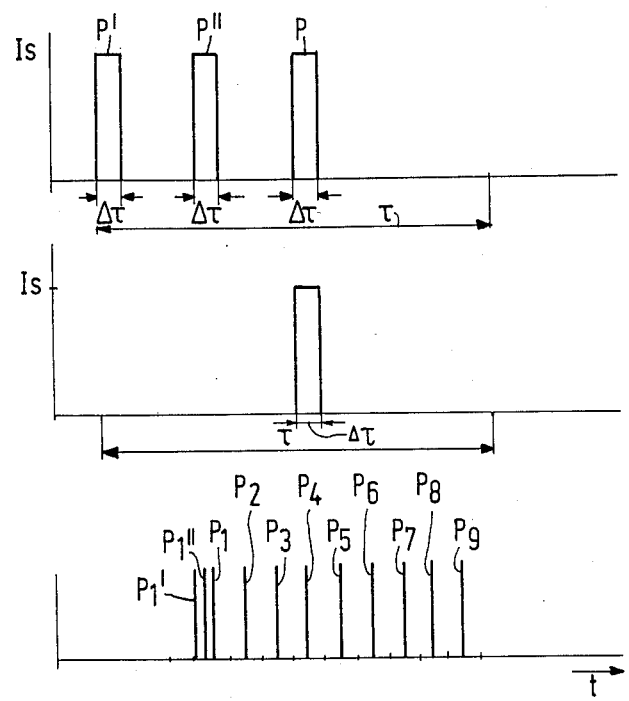
FIG. 7a illustrates a method of applying radiation energy, in which two overlapping recording marks are obtained in the first selected time interval $\tau$. In accordance with this method, the radiation energy is applied by means of three radiation pulses P, P', P" of equal energy content, of which P' serves as a preheating pulse and of which P and P" serve as writing pulses.
FIG. 7b illustrates the application of the radiation energy for the second and subsequent selected time intervals $\tau$ of a sequence of consecutive selected time intervals $\tau$. The radiation energy is now applied to the information layer 2 by means of only one unitary radiation pulse.
Figure 8:
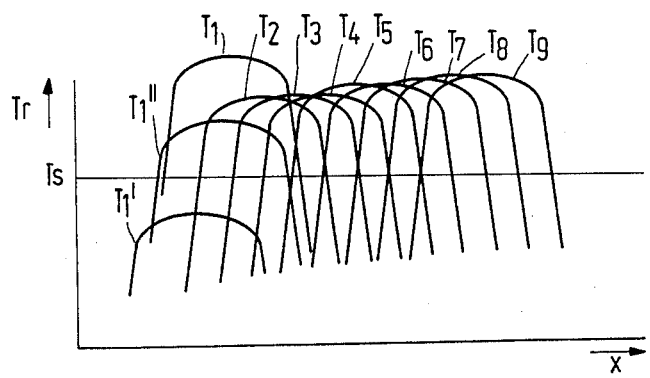
FIG. 8a shows the unitary radiation pulses $P_1'$, $P_1''$ and $P_1, \ldots, P_9$ which are generated in a sequence of nine consecutive selected time intervals $\tau_1, \ldots \tau_9$, the radiation energy being applied in the manner illustrated in FIG. 7.
FIG. 8b illustrates the temperature distribution $T_1'$, $T_1''$, $T_1, \ldots, T_9$ in the information layer 2 immediately after application of the radiation pulses P', P", $P_1, \ldots, P_9$.
Figure 8:
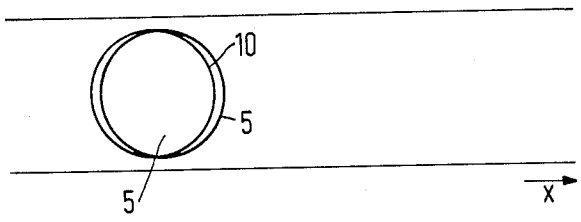

In FIG. 8c the area with modified optical properties formed in the first selected time interval of the sequence bears the reference numeral 10. The area 10 comprises two overlapping recording marks 5 produced by radiation pulses $P_1''$ and $P_1$.

Another method in accordance with the invention will be described with reference to FIG. 15, which method enables the afore-mentioned heat-sensitive information layers to be provided with an information pattern whose dimensions comply with the aforementioned standard for ablative recording of EFM signals by means of a radiation beam of the same diameter as is customary in ablative recording.

FIG. 15a shows an EFM coded information signal comprising four consecutive bit cells of the logic value "1". An information pattern corresponding to this information signal can be written by means of the radiation pulses $P^{**}_1$, $P^*_1$, $P^*_2$ and $P^*_3$ shown in FIG. 15b. The corresponding temperature differences $T^{**}_1$, $T^*_1$, $T^*_2$ and $T^*_3$ are given in FIG. 15c. By means of the radiation pulses $P^*_1$ and $P^*_2$, two overlapping recording marks 5a and 5b are produced, the dimensions of the two overlapping recording marks corresponding to the optimum dimension for ablative recording. The radiation pulse $P^{}_1$ functions as a preheating pulse. It is to be noted that the preheating pulse $P^{}_1$ causes the temperature $T^{**}_1$ of the information layer to rise to a level above the recording level $T_S$. As a result of this, the optical properties of the information layer are modified within an area 50. However, this is not a problem if this area, as is shown, is so small that it is overlapped completely by the recording mark 5a. In that case the change in optical properties in the area $\sim$50 does not influence the dimensions of the information pattern. By means of the radiation pulse $P^*_3$ the recording mark 5c is recorded, the recording mark 5c overlapping the recording mark 5b to such an extent that the area with modified optical properties formed by the recording marks 5a, 5b and 5c corresponds to four bit cells of the logic value "1". The sequence of consecutive radiation pulses $P^{**}_1$, $P^*_1$, $P^*_2$ and $P^*_3$ can be obtained in that the first selected time interval $\tau_1$ of a sequence of consecutive selected time intervals two radiation pulses which are shifted relative to each other are generated at fixed instants $t_1$ and $t_2$ within the time interval $\tau_1$ and in that subsequently in the second and subsequent selected time intervals $\tau_2$, $\tau_3$, . . . each time a radiation pulse is generated at a fixed instant $t_3$ within each of these time intervals.

Figure 9:
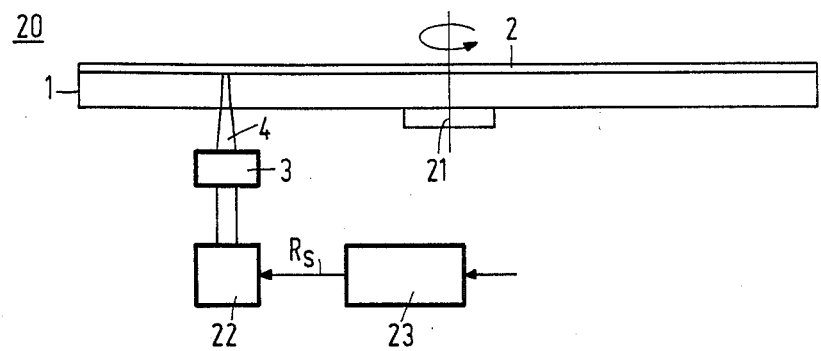

FIG. 9 shows an embodiment of an apparatus 20 for carrying out the inventive method. The apparatus 20 comprises a drive system 21 for rotating the disc-shaped information carrier 1. The optical system 3 is arranged opposite the information layer 2 of the rotating record carrier 1 to focus the radiation beam 4 originating from a light source 22 on the information layer 2. The radiation source 22 is of a type in which the intensity of the emitted radiation can be modulated by means of a control signal $R_s$ generated by a control device 23. The radiation source 22 may be, for example, a solid-state laser which can be turned on or off depending on the logic level of the control signal $R_s$.

Figure 10:
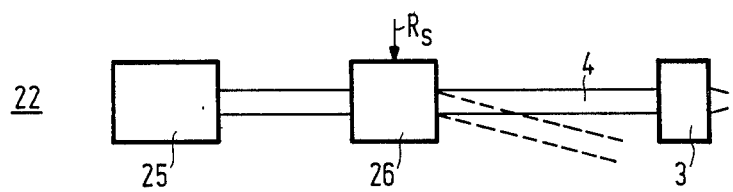

Another suitable radiation source 22 is shown in FIG. 10. The radiation source 22 comprises a laser 25 for continuously generating the radiation beam 4. The beam 4 is passed through an acousto-optic modulator 26 which is controlled by the control signal $R_S$. The acousto-optic modulator 26 deflects or does not deflect the beam 4 depending on the logic level of the control signal, so that the beam 4 is transmitted to the optical system 3 depending on the control signal $R_S$.

Figure 11:
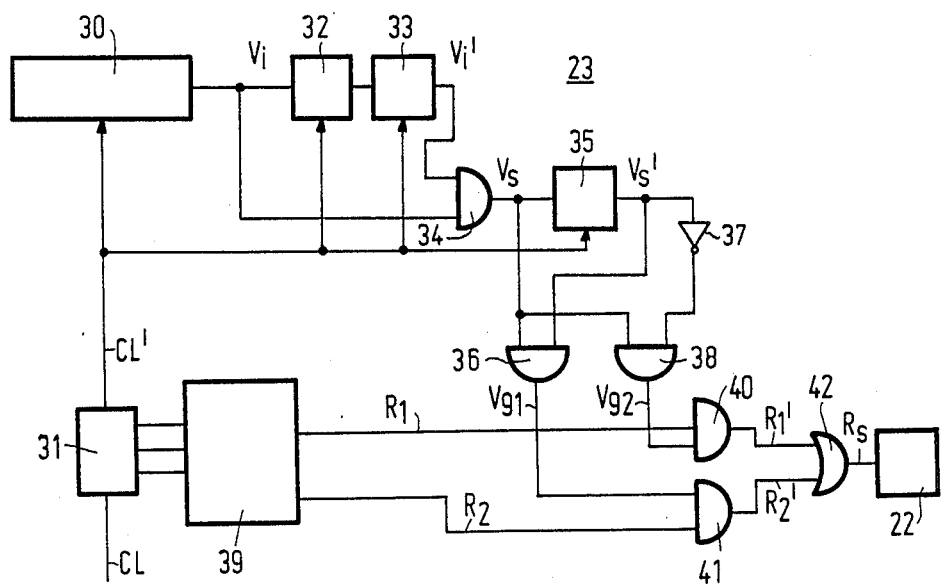
Figure 12:
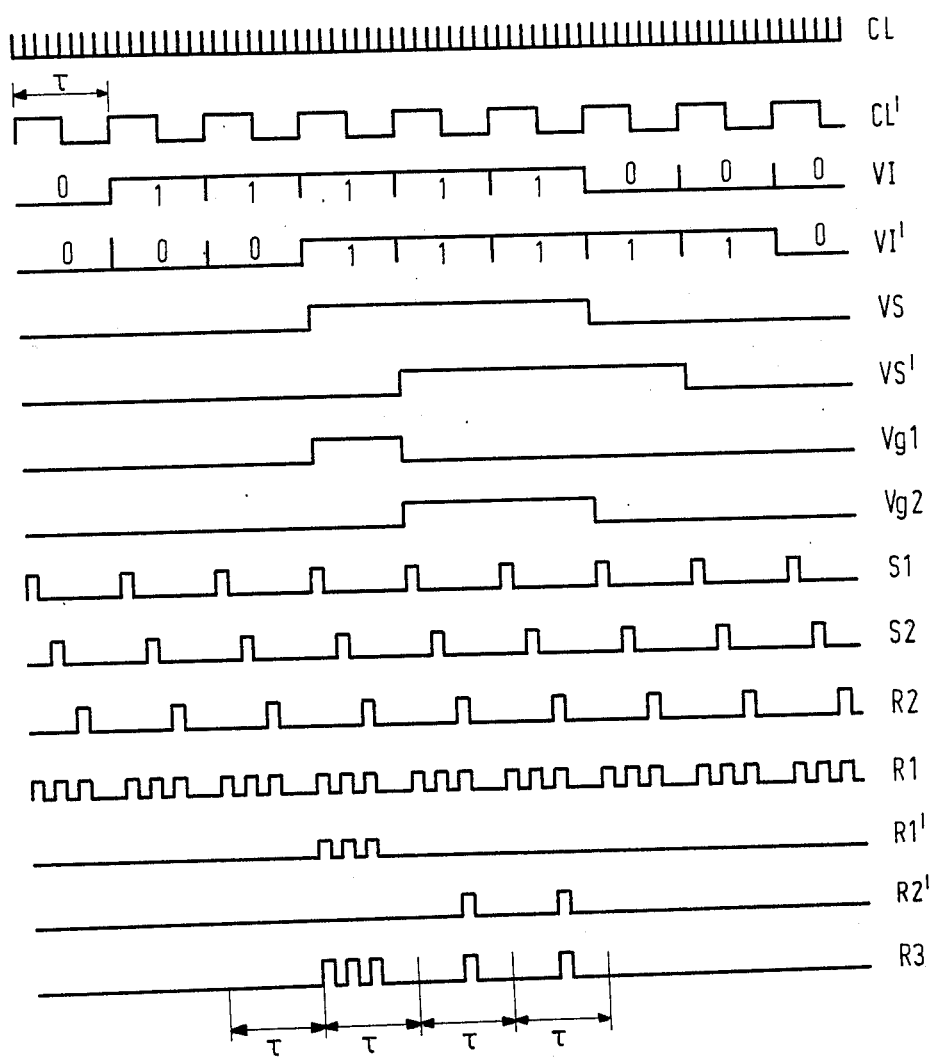

FIG. 11 by way of example shows a control device 23 for generating the control signal $R_S$ for the radiation source 22. The information signal $V_i$ (see FIG. 12) is a binary signal in which the number of consecutive bit cells of the logic value "1" is at least equal to three, for example an EFM coded signal. The control device 23 comprises a memory 30 for storing the information signal $V_i$ to be recorded. The memory 30 is of a type which delivers the information signal $V_i$ on an output in synchronism with a clock signal $c1'$. Such a memory may be, for example, a shift register. The consecutive periods of the clock signal $c1'$ correspond to the consecutive time intervals. The clock signal $c1'$ is derived from a clock signal $c1$ whose frequency is eight times as high by means of a 3-bit counter 31. FIG. 12 shows the signals $c1$, $c1'$ and $V_i$ as a function of time. The clock signal $c1$ is in synchronism with the speed of recording 1 in the area where the information signal $V_i$ is to be recorded. The manner in which the clock signal is derived falls beyond the scope of the present invention and is therefore not described. For this reference is made to the Netherlands Patent Application No. 8000121 which corresponds to U.S. application Ser. No. 110,063 filed Oct. 8, 1987 and comprehensively describes a method of deriving a speed-synchronous clock signal for the purpose of recording on an optically readable record carrier. The information signal $V_i$ supplied by the memory 30 is delayed by two periods of the clock signal $c1'$ by means of delay circuits 32 and 33, for example 1-bit shift registers controlled by the clock signal $c1'$. The delayed information signal $V_i'$ is shown in FIG. 12. An AND gate 34 derives from the information signal $V_i$ and the delayed information signal $V_i'$, a signal $V_s$ which indicates the selected time intervals in which a recording mark is to be formed.

By means of a memory 35 in the form of a flip-flop which is clocked by a clock signal $c1'$, the signal $V_s$ is stored for one time interval $\tau$. By means of an AND gate 36 a signal $V_{g1}$ is derived from the signals $V_s$ and $V_s'$, to indicate that the selected time interval $\tau$ indicated by $V_s$ is preceded by selected time interval $\tau$. By means of an inverter circuit 37 and AND gate 38, a signal $V_{g2}$ is derived from the signals $V_s$ and $V_s'$ to indicate that the selected time interval $\tau$ indicated by $V_s$ is preceded by a non-selected time interval $\tau$. By means of a circuit 39 two control signals $R_1$ and $R_2$ are derived from the count of the 3-bit counter 31. The signal $R_1$ represents the control signal for the radiation source 22 in each first selected time interval $\tau$ of a sequence of consecutve selected time intervals $\tau$. The signal $R_2$ represents the control signal for the radiation source 22 in each second and subsequent selected time interval of each sequence of consecutive selected time intervals $\tau$. If the signal $V_{g2}$ indicates that a recording mark is to be written in a first interval of a sequence of selected time intervals, the control signal $R_1$ is transferred to the radiation source 22 by means of an AND-gate 40 and an OR-gate 42. If the signal $V_{g2}$ indicates that a recording mark is to be written in a second or subsequent time interval of the sequence, the control signal $R_2$ is transferred to the radiation source 22 by means of an AND-gate 41 and the OR-gate 42.

Figure 13:
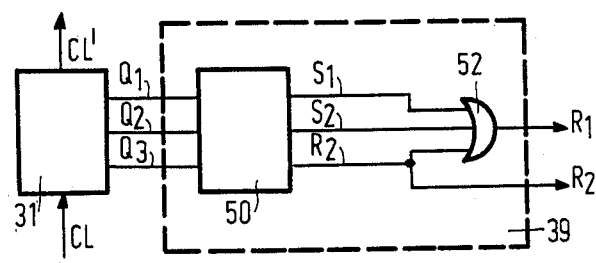

The control signals $R_1$ and $R_2$ shown in FIG. 12 comprise pulses of constant duration, in such a way that for $R_1$ three unitary pulses are generated in each time interval $\tau$ and for $R_2$ only one unitary pulse is generated in each time interval $\tau$. The control signals $R_1$ and $R_2$ may be derived from, for example, the counts of the counter 31 by means of the circuit 39 shown in FIG. 13, which circuit comprises a gate circuit 50 for generating three signals $S_1$, $S_2$ and $R_2$ depending on the count of the counter 31.

The relationship between the consecutive counts $A_0$, ..., $A_7$, the output signals $Q_1$, $Q_2$ and $Q_3$ of the counter 31 and the output signals $S_1$, $S_2$ and $R_2$ is given in the following Table 1.

TABLE 1

| count | $Q_1$ | $Q_2$ | $Q_3$ | $S_1$ | $S_2$ | $R_2$ |
|---|---|---|---|---|---|---|
| $A_0$ | 0 | 0 | 0 | 1 | 0 | 0 |
| $A_1$ | 0 | 0 | 1 | 0 | 0 | 0 |
| $A_2$ | 0 | 1 | 0 | 0 | 1 | 0 |
| $A_3$ | 0 | 1 | 1 | 0 | 0 | 0 |
| $A_4$ | 1 | 0 | 0 | 0 | 0 | 1 |
| $A_5$ | 1 | 0 | 1 | 0 | 0 | 0 |
| $A_6$ | 1 | 1 | 0 | 0 | 0 | 0 |
| $A_7$ | 1 | 1 | 1 | 0 | 0 | 0 |

The signals $S_1$, $S_2$ and $R_2$ are applied to an OR-gate 51 on whose output the signal $R_1$ is generated.

Figure 14:
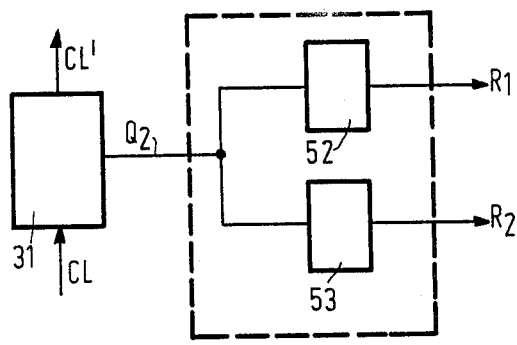

FIG. 14 shows another example of the circuit 39 for generating control signals $R_1$ and $R_2$, a control pulse of a first width being generated for the signal $R_1$ in each time interval and a control pulse of a second width smaller than the first width being generated for the signal $R_2$ in each time interval. For this purpose the circuit comprises two monostable multivibrators 52 and 53 each generating pulses of different widths in response to a 0–1 transition of the output signal $Q_1$ of the counter 31.

Figure 15:
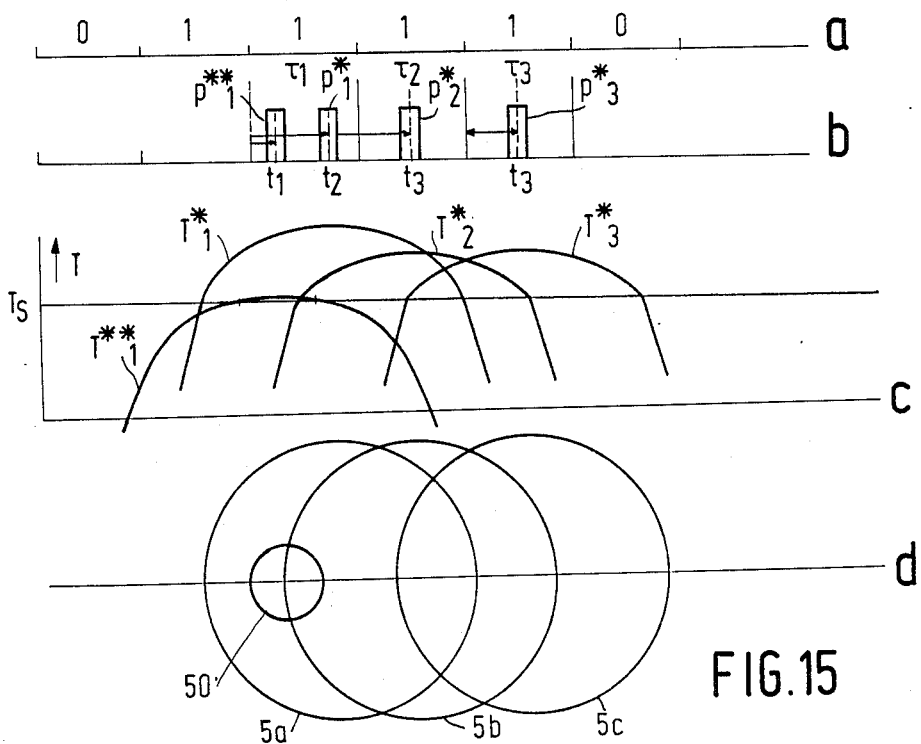
Figure 16:
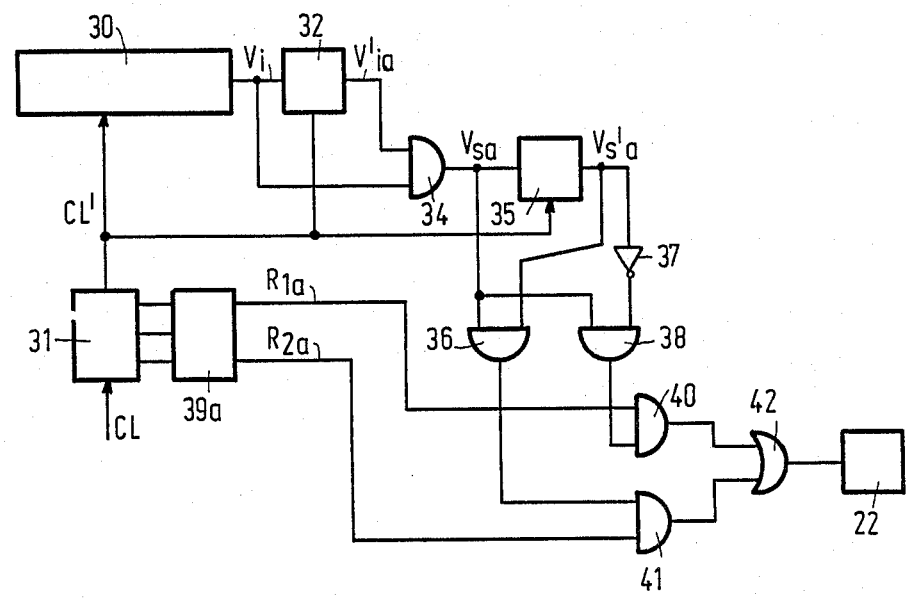

FIG. 16 shows an embodiment of an apparatus for carrying out the method illustrated in FIG. 15, the elements of the apparatus corresponding to those in FIG. 14 bearing the same reference numerals. In FIG. 16, instead of the signal $V_i$ and the signals $V_i'$ delayed by two clock periods of $c1'$, the signal $V_i$ and the signal $V_{i\alpha}'$ which has been delayed by one clock period of $c1'$ are applied to the AND-gate 34. In the embodiment shown in FIG. 16 the output signal $V_{sa}$, which indicates the selected time intervals $\tau$, becomes "1" during $(s-1)$ time intervals for each sequence of s (s being an integer) consecutive bit-cells of the logic value "1". During the first selected time interval of the sequence represented by the signal $V_{sa}$ the output signal $R_{1a}$ is transferred to the radiation source 22 by the circuit 39a. During the second and subsequent selected time intervals of each sequence of selected time intervals the signal $R_{2a}$ is supplied. The signals $R_{1a}$ and $R_{21}$ can be derived from the count of the counter 31 in the same way as is illustrated, for example, in FIG. 13. The relationship between $R_{1a}$, $R_{2a}$ and the output signals $Q_1$, $Q_2$ and $Q_3$ of the counter 31 is given in the following Table 2.

TABLE 2

| count | $Q_1$ | $Q_2$ | $Q_3$ | $R_{1a}$ | $R_{2a}$ |
|---|---|---|---|---|---|
| $A_0$ | 0 | 0 | 0 | 0 | 0 |
| $A_1$ | 0 | 0 | 1 | 1 | 0 |
| $A_2$ | 0 | 1 | 0 | 0 | 0 |
| $A_3$ | 0 | 1 | 1 | 0 | 1 |
| $A_4$ | 1 | 0 | 0 | 1 | 0 |
| $A_5$ | 1 | 0 | 1 | 0 | 0 |
| $A_6$ | 1 | 1 | 0 | 0 | 0 |
| $A_7$ | 1 | 1 | 1 | 0 | 0 |

The control device described in the foregoing generates only control signals of two different types for the radiation source 22. It is obvious that in a similar way control signals of a larger number of different types can be generated.

In the foregoing the invention has been described, by way of example, for an EFM-coded information signal. For such an information signal the dimensions of the recording mark in a selected time interval correspond to a sequence of 3 bits of the same type. Longer bit sequences of the same type are then obtained by forming overlapping recording marks. The method of the invention provides compensation for temperature effects caused by the radiation energy applied in preceding time intervals. Such temperature effects also occur when recording information signals in which the length of the recording mark corresponds to a length other than three bits, for example one bit. It is obvious that the invention can readily be applied to such cases.

The invention is described for an information layer of a material whose structure can be modified from amorphous to crystalline by heating. It will also be obvious to those skilled in the art that the invention can also be utilized with other materials whose optical properties can be modified by heating, for example materials in which the application of heat initiates a chemical reaction which results in a change in optical properties, or with materials used in thermomagnetic recording. For a survey of these materials reference is made to pages 219–225 of the afore-mentioned book "Principles of Optical Disc Systems".

What is claimed is:

1. A method for recording a binary signal comprised of first and second logic values on an optical record carrier having a layer whose optical property changes upon heating, said method comprising the steps of:

directing a beam of radiation onto said layer, moving one of said beam and said record carrier relative to the other, pulsing said beam in accordance with said binary signal so as to produce a pulse sequence of separate, radiation pulses, which pulse sequence represents a given sequence of said logic values of said binary signal, said radiation pulses having an energy content such that marks are produced on said record carrier upon heating of said layer by said pulses and thereby producing said change in said optical property, said pulses of said pulse sequence being such that said marks produced thereby overlap to form an elongated recording mark, and subjecting said energy content of said radiation pulses in said pulse sequence in dependence on the position of a given pulse in said pulse sequence so that the dimension of said elongated recording mark in a direction transverse to the longitudinal direction thereof is substantially constant.

2. A method according to claim 1 wherein said binary signal is comprised of consecutive bit cells with said binary signal having either said first logic value or said second logic value in each bit cell and wherein said elongated recording mark represents a plurality of consecutive bit cells having the same logic value.

3. The method according to claim 1 or 2 wherein the first pulse of said pulse sequence has a first energy content and the subsequent pulses of said pulse sequence have an energy content which is lower than the energy content of said first pulse.

4. The method according to claim 3 wherein said subsequent pulses have substantially the same energy content.

5. The method according to claim 3 wherein each of said subsequent pulses has a lower energy content than the preceding pulse.

6. The method according to claims 1 or 2 wherein the energy content of said pulses in said pulse sequence is adjusted by varying the width of a given pulse while maintaining the intensity of the radiation beam constant.

7. A method for recording a binary signal comprising a sequence of bit cells with said signal having either a first or a second logic value in each bit cell on an optical record carrier havin a layer whose optical property changes upon heating, said method comprising the steps of:

directing a beam of radiation onto said layer, moving one of said beam and said record carrier relative to the other, pulsing said beam in accordance with said binary signal so as to produce a pulse sequence of separate, radiation pulses, the first pulse of said sequence being a preheating pulse which, after a predetermined time interval, is followed by at least one write pulse having an energy content such that a mark is produced on said record carrier by said at least one write pulse heating said layer and thereby producing said change in said optical property, said predetermined time interval being such that the areas of impingement of said preheating and said at least one write pulse on said layer overlap, and wherein said preheating pulse has an energy content inadequate to produce said change of said optical property outside the area of said mark produced by said at least one write pulse.

8. The method according to claim 7 wherein said energy content of said preheating pulse is inadequate to produce a change in said optical property of said layer.

9. The method according to claim 7 or 8 wherein said pulse sequence includes a plurality of said write pulses such that said marks produced thereby overlap so as to form an elongated recording mark representing a given sequence of said logic values.

10. The method according to claim 9 wherein said write pulses of said plurality have substantially the same energy content.

11. The method according to claim 9 wherein said elongated mark represents a sequence of bit cells having the same logic value.

12. An apparatus for recording a binary signal comprised of first logic values and second logic values on an optical record carrier having a layer whose optical property changes on heating, said apparatus comprising means for producing a beam of radiation which is projected onto said record carrier, means for producing relative movement between said beam and said record carrier, means for pulsing said beam in accordance with said binary signal so as to produce a pulse sequence of separate radiation pulses, a plurality of consecutive radiation pulses of said pulse sequence having an energy content adequate to heat said layer and change said optical property thereof so that said consecutive pulses produce overlapping marks in said layer which form a recording mark which is elongated in the direction of relative movement between said beam and said record carrier, said elongated recording mark representing a given sequence of said logic values of said binary signal, and means for adjusting the energy content of said radiation pulses in said pulse sequence in dependence on the position of a given pulse in said pulse sequence such that the dimension of said elongated recording mark in a direction transverse to the longitudinal direction thereof is substantially constant.

13. The apparatus according to claim 12 wherein the first pulse of said pulse sequence has a larger energy content than the other pulses in said pulse sequence.

14. The apparatus according to claim 13 wherein the energy content of said other pulses in said pulse sequence is substantially constant.

15. The apparatus according to claim 13 wherein the energy content of said pulses in said pulse sequence decreases sequentially from one pulse to the next.

16. The apparatus according to claim 12 wherein said pulse sequence comprises a preheating pulse which precedes said plurality of consecutive pulses by a predetermined time interval and which has an energy content lower than the energy content of said consecutive pulses.

17. The apparatus according to claim 16 wherein said energy content of said preheating pulse is inadequate to heat said layer sufficiently to produce said change in said optical property.

18. The apparatus according to claims 16 or 17 wherein the energy content of said consecutive pulses is substantially the same.

19. A method as claimed in claim 2, wherein the number of consecutive bit cells of said first logic value is at least equal to n, n being an integer greater than or equal to 2, and said elongated recording mark has a length corresponding to m bit cells, m being an integer greater than or equal to 2, and is obtained by marks each formed by a radiation pulse at every instant of a series of $m-n+1$ substantially equidistant instants, and wherein at a predetermined time interval before the first instant of said series of instants, an extension radiation-pulse is generated to form an extension recording mark which overlaps the mark formed at the first instant of the series of instants to such an extent that the dimensions of the two overlapping marks correspond to the length of n bit cells.

* * * * *